Patented May 18, 1954

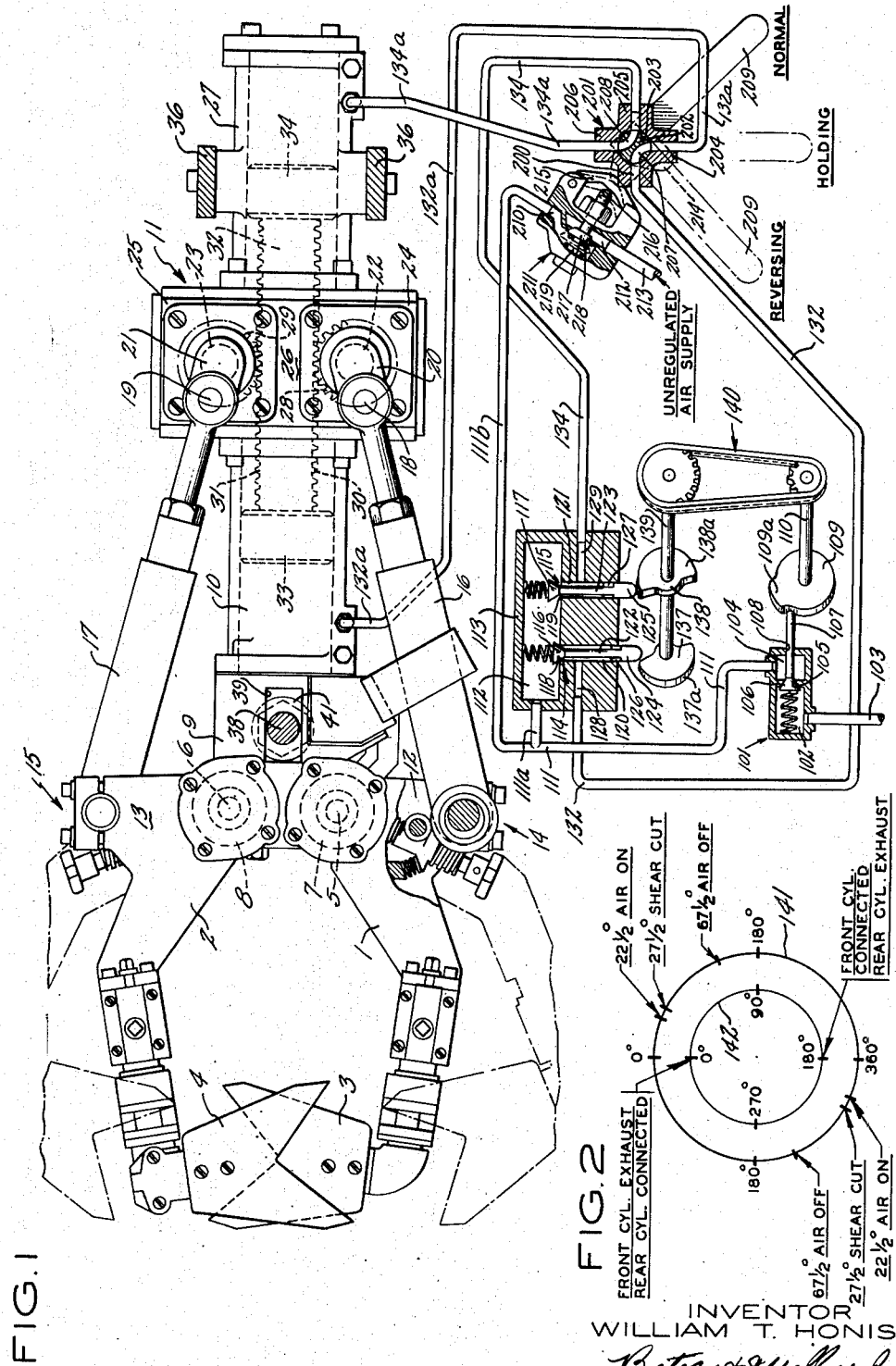

2,678,519

UNITED STATES PATENT OFFICE 2,678,519

PNEUMATIC CONTROL MEANS FOR GLASS SEVERING MECHANISM

William T. Honiss, West Hartford, Conn., assignor to Emhart Manufacturing Company, Hartford, Conn., a corporation of Delaware Application March 27, 1953, Serial No. 345,191

9 Claims. (Cl. 49—14)

This application is a continuation in part of my co-pending application, Serial No. 237,342, filed July 18, 1951, for an improvement in severing mechanism for cutting molten glass.

In my co-pending application, Serial No. 237,342, I disclose a glass severing mechanism comprising shear blades carried by pivoted shear arms and a fluid pressure actuated motor operatively connected to the shear arms to effect closing of the shear blades at about the middle of each stroke of the motor piston and opening of the shear blades during the remainder of such stroke. The present application is being filed to disclose and claim novel pneumatic control means operatively associated with the air motor so as to assure periodic cutting strokes of the shear blades at uniform time intervals during normal operation of the mechanism, substantially as disclosed in my foresaid application, Serial No. 237,342, and, in addition, manually operable means combined therewith to reverse the direction of travel of the shear blades should their normal operating movements be halted before completion for any reason.

A practical embodiment of the invention of the present application is shown in the accompanying drawings, in which:

Fig. 1 is a view, mainly in plan but with parts shown in section, of a somewhat schematic arrangement of timing and pneumatic control means including manually operable emergency reversing mechanism of the present invention operatively connected with the air motor of a shear mechanism of the character described; and Fig. 2 is a diagram showing sequence and timing of the operations of the valves of the fluid pressure supply and exhaust system for two successive strokes of the motor piston and successive regularly timed shear cuts.

Generally described, the improved shear mechanism comprises a pair of shear arms 1 and 2, respectively, the free ends of which carry co-operative shear blades 3 and 4, respectively, as best seen in Fig. 1. The shear arms 1 and 2 are pivotally supported adjacent to their ends opposite the blades for swinging movements about the axes of vertical spindles 5 and 6, respectively. These are mounted in tubular holders 7 and 8, respectively, carried by a bracket 9, projecting from one end of a cylinder 10, which forms part of an air motor generally designated 11 for operating the shear arms.

The shear arms 1 and 2 are provided adjacent to their pivotally supported ends with outturned arms or knuckles 12 and 13, respectively, operatively connected by adjustable coupling mechanisms indicated at 14 and 15, respectively, with links 16 and 17, respectively, extending to and operatively mounted at their rearward ends on upright crank pins 18 and 19, respectively, on horizontal crank arms 20 and 21, respectively, carried by the upper ends of vertical crank shafts 22 and 23, respectively. These crank shafts are housed in opposite lateral wing portions 24 and 25, respectively, of an intermediate transmission housing 26 which is located between and operatively connects the front motor cylinder 10 with a similar rear motor cylinder 27.

The crank shafts 22 and 23 carry pinions 28 and 29, respectively, in mesh with rack bars 30 and 31, respectively, carried on the opposite sides of a horizontal piston rod 32 which extends through the transmission housing into the cylinders 10 and 27 and is rigidly joined at its opposite ends to a piston 33 in the cylinder 10 and a piston 34 in the cylinder 27, respectively. The rack bars may be integral portions of the piston rod or formed separately and fixed thereto in any suitable known manner.

The shear mechanism is suspended adjacent to its rearward end, which is remote from the shear blades, from the bottom of a forehearth (not shown) by a suspension mechanism indicated in Fig. 1 by the fragmentary lower portions of a pair of suspending bars 36. Co-operative with this rear suspension mechanism is a front suspension mechanism which is fastened to the bottom of the forehearth and in Fig. 1 is represented by the fragmentary lower end portion of a vertical suspension stud indicated at 38. This stud depends through a slot 39 in the bracket 9 and carries a supporting element 41 located beneath the bracket and on which the slotted portion of the bracket rests. The details of suspension means for supporting the shear mechanism from the bottom of a feeder forehearth so that the blades will be located as desired in relation to a glass discharge outlet of a feeder are illustrated and described in my foresaid application, Serial No. 237,342, and will not be further disclosed herein.

In a practical set-up, the shear mechanism will be positioned so that its blades close at a downward extension of the axial or center line of the glass discharge outlet of the feeder and at a predetermined distance below that outlet.

The air motor 11 is operated by admitting air under pressure to the remote or distal ends of the cylinders 10 and 27 and has a combination air intake and exhaust conduit connected therewith as is conventional, such conduits being elements of a pressure air supply and exhaust system which presently will be described.

It will be apparent that the connected pistons 33 and 34 together comprise the piston of the air motor and that each stroke of the motor piston will cause swinging movements of the shear arms from their opened positions, indicated by dot-and-dash lines shown in Fig. 1, to their closed positions as shown by the full lines, at which the shear blades are closed for a glass cutting action. Closing of the shear blades will take place when the air motor piston is at about its mid-stroke, giving the blades a maximum cutting power and a motion that is smooth and continuous, even during reversal which is effected by the remainder of the stroke of the air motor piston.

The shear blades 3 and 4 have V-shaped cutting edges which sweep evenly across each other during their closing movements in normal operation. If for any reason these blades are prevented from closing to complete their cutting strokes, as by the presence of a large stone or hard object in the molten glass to be cut or by mechanical interference of one blade edge with the other or jamming of relatively movable parts, quick retraction of the shear blades then becomes imperative if damage to movable parts or piling up of glass issuing from the feeder outlet is to be minimized and avoided. A manually operable means for use in such an emergency to reverse the travel of the blades is a feature of the timing and pneumatic control means of the instant application.

Referring now to the timing and pneumatic control means shown in the lower portion of Fig. 1, a timing valve 101 has an intake chamber 102 receiving air under pressure, as at a maximum line pressure of 30 lbs. per sq. inch, from a supply pipe 103. An outlet chamber 104 in valve 101 may receive air from chamber 102 through a connecting port 105 when a spring pressed valve 106 is moved to the left from its normally closed, seated position in port 105 as shown in Fig. 1. Valve 106 has a rigid stem 107 extending through chamber 104 and through an opening 108 in the right hand end wall of the valve casing so as to project therefrom to a position in working relation to the periphery of a shear cut timing cam 109 which is fast on a shaft 110. The shaft 110 may be the usual feeder cam shaft of a conventional glass feeder or it may be a separate shaft geared to the feeder cam shaft by suitable known means, not shown, to rotate in unison with and at the same speed as the feeder cam shaft. The cam 109 has a high peripheral portion or rise 109a which will engage with and bias the end of valve stem 107 to the left in Fig. 1 so as to move valve 106 from its seat and maintain the valve 101 open while shaft 110 is rotating through part of a complete revolution, as through 45°.

When valve 101 is open, air under pressure will pass through chamber 104 to valve outlet pipe 111 having a terminal branch pipe 111a, delivering air to an air intake chamber 112 formed in a block 113. Outflow of air from chamber 112 is through one or the other of two similar switching valves 114 and 115, respectively, provided in block 113. Each of these switching valves comprises a spring pressed valve element 116 or 117 normally seated in the inner end 118 or 119 of a passage 120 or 121 extending in the block 113 from a wall of the chamber 112 to the exterior of the block. A rigid stem 122 or 123 on the valve 114 or 115 extends through the passage 120 and 121 so as to project beyond the outer end of that passage where it is enlarged as indicated at 124 or 125 to close the outer end of its passage 120 or 121 when its connected switching valve element is in raised or open position as shown for valve element 117. The stems 122 and 123 are fluted or otherwise formed where they extend through the passages 120 and 121, respectively, to provide longitudinal air passages as indicated at 126 and 127, respectively, between themselves and the walls of such passages. Air under pressure from the intake chamber may flow to passage 120 or 121 and thence to a lateral passage 128 or 129, extending through one or the other of opposite ends of the block 113 when valve element 116 or 117 has been opened. At the same time, exhaust of return air to the atmosphere may be effected through the other lateral passage 129 or 128 and the communicating passage 127 or 126, one of the exhaust control elements 125 or 124 then being open. It will be understood that in service the valve elements 116 and 117 are opened alternately, thereby closing exhaust valve control elements 125 and 124, respectively, connected therewith.

The lateral passage 128 is connected by a pipe 132 to a pipe connection or nipple 200 of a four way valve generally indicated 201. This valve may be of any suitable known structure. As shown, it includes a rotary cylindrical plug 202 fitting in a cylindrical central valve bore 203 with which the bores of pipe connection or nipple 200 and three additional pipe connections or nipples 204, 205 and 206, respectively, communicate at places spaced uniformly around its wall and hence 90° apart. The rotary valve plug 202 is formed at opposite sides of its center line with a pair of transversally extending substantially right angular, through passages 207 and 208, respectively, lying in the plane of the pipe connections 200, 204, 205 and 206. Each of these through passages opens at its opposite ends through the peripheral wall of the plug at places 90° apart and hence in register with the inner ends of the bores of two adjacent pipe connections or nipples of the four-way valve when the plug is in an appropriate angularly turned position in the valve casing. The valve plug may be provided with a handle 209 which can be conveniently grasped and turned by hand to turn the plug about its axis to or between angularly adjusted positions appropriate for the action desired.

As shown by the full lines in Fig. 1, the handle 209 is at the position appropriate for normal operation of the shear mechanism. Air under pressure supplied by pipe 132 to valve connection 200 then may pass through the passage 207 in valve plug and pipe connection 204 to a pipe 132a connecting the latter to the front end of the front cylinder 10 of the air motor 11. A pipe 134 connects the lateral passage 129 of the switching valve assembly with the pipe connection or nipple 205 of the four-way valve. Nipple 205 communicates through passage 208 in the valve plug with the pipe connection or nipple 206 and the latter is operatively connected by a pipe 134a with the rearward end of rear cylinder 27 of the air motor.

The switching valves are opened alternately by cams 137 and 138, respectively, on a cam shaft 139 having a driven connection at 140 with the cam shaft 110 so as to be driven at half the speed of the latter. The cams 137 and 138 have lobes or high portions 137a and 138a, respectively, which are adapted to engage with the projecting valve exhaust control elements 124 and 125, respectively, so as to bias the valve assemblies 116—122—124 and 117—123—125, respectively, upwardly as viewed in Fig. 1. These cam lobes in the example shown are 180° in extent and are 180° out of phase with each other. The right hand switching valve is being held open by its cam 138 while cam 137 is in position to permit exhaust through the exhaust outlet of the closed left hand switching valve.

The operation of the air supply and exhaust system so as to obtain successive shear cuts at exactly the same time interval apart will be understood by reference to the chart in which an outer circle 141 represents two successive complete revolutions of the timing valve cam shaft 110 during which a single revolution of the cam shaft 139 for the switching valves, indicated by the inner circle 142, and two successive strokes of the air motor piston—a forward stroke and a return rearward stroke—will be effected. At positions indicated at 0°—0° on the circles of the chart, the timing valve 101 is closed, the valve element 116 of the front cylinder switching valve is closed and its exhaust control element 124 is open, and valve element 117 of the rear cylinder switching valve is open and its exhaust control element 125 is closed. However, air under pressure to operate the shears cannot pass to the rear cylinder of the shear motor until the timing valve 101 has been opened by its cam 109. Exhaust of pressure in excess of atmospheric air pressure can take place from the front cylinder. Opening of the timing valve 101 is indicated at 22½° on outer circle 141. This is just after the stage indicated by the positions of the parts in Fig. 1.

Opening of the timing valve 101 thus will cause a forward power stroke of the air motor piston and the shear cut will occur at about the midstroke, indicated at 27½° on the outer circle of the chart. Cushioning of the final portion of this forward power stroke will be effected by compression of atmospheric air pressure remaining in the front cylinder which is still connected to exhaust. At 67½° the timing valve is closed. At 180° on the inner circle, the cam shaft 139 for the switching valves will have completed half a revolution and the cams thereon will reverse the positions of the switching valves. That is, the rear cylinder of the air motor will be connected to exhaust and the front cylinder will be connected for flow of air thereto when the timing valve 101 next is tripped. The timing valve cam shaft will have completed one revolution. At 22½° of the next revolution, it will be opened and air will be supplied to the front cylinder to drive the air motor piston on its rearward power stroke. The shear cut will occur at 27½° in the outer circle when about half of the rearward power stroke will have been completed. The remainder of such stroke will of course open the shears. The air will be cut off from the front cylinder by closing of the timing valve 101.

At 0° on the inner circle a revolution of the cam shaft 139 for the switching valves will be completed and the switching valves will again be reversed. The sequence of events just described will then be repeated. There will be exactly the same time interval between each two successive shear cuts. This would be difficult or impossible to assure, at least for continued service of substantial duration, were the instants of successive shear cuts determined by the operation of two different timing cams instead of by a single timing cam and co-operative switching valve cams as just described.

In service, however, the shears at times may be prevented from completing their regular operating cycles. A stone in the path of the closing shear blade edges may prevent completion of a cutting stroke. A slightly bent or improperly positioned shear blade may result in interlocking engagement of the V-shaped edge portions of the blades rather than one sliding smoothly over the other as intended. Quick reversal of the air motor operating the shear blades is desirable should these blades be prevented from completing their cutting movements by either of the aforesaid or any other reason. The air supply and control mechanism of the assembly shown in Fig. 1 includes parts which may be operated manually to accomplish this desirable result, as now will be explained.

The handle 209 of the four-way valve may be swung to the left from the position shown by full lines and designated "normal" to the "reversing" position so indicated in Fig. 1. This will reverse the air connections through the four-way valve from the switching valves to the air motor front and rear cylinders, respectively. This will tend to retract the shear blades from the positions at which they were halted before completion of a cutting stroke. Additional pressure beyond that supplied by a switching valve may be needed or desirable should the shear blades be jammed and also to assure instant starting back of the air motor piston when the handle of the four-way valve is turned to "reversing" position, irrespective of the action of timing valve 101 at that time.

To this end, an air supply line 111b connects the outlet 210 of a normally closed auxiliary air valve 211 with the air supply pipe 111 which periodically delivers air under a maximum pressure of 30 lbs. per sq. inch to the air intake chamber 112 of the switching valves. The valve 211 has an inlet 212 with which a pipe 213 is connected. Pipe 213 delivers air at a pressure which may be unregulated but is higher than 30 lbs. per sq. inch to valve 211. When the handle 209 is turned to the "reversing" position, shown in Fig. 1, a cam projection 214 is turned therewith against a pivoted lever 215 on the valve 211. Lever 215 bears against the outer end of normally projected stem 216 of spring-pressed valve member 217. The cam projection 214, in moving to the left in Fig. 1 from its inactive to its active position, will bias the lever 215 and valve stem 216 inwardly so as to force valve member 217 from its seat 218 against the pressure of spring 219. This will permit the high pressure air from the pipe 213 to pass through the valve 211 and connecting pipes to the chamber 112 of the switching valves. Operating air under pressure will be supplied through the open switching valve to the air motor to effect instant reversal of the latter and retraction of the shear blades.

It may be desirable to retain the shear arms and blades in their open or retracted positions after an emergency manually effected reversing operation as just described. The interruption of normal cyclic cutting operations by the shears may have been attended by piling up of excess glass that has been discharged from the feeder outlet or damage to the blades or connected parts. Such excess glass must be cleared away and any damaged parts repaired or replaced. The handle 209 therefore may be returned from the "reversing" position only half way to the "normal" position, this being the position indicated by the legend "holding." The four-pay valve 201 then will be closed to flow of air therethrough to or from the air motor and the operations of the shears will be stopped with the shear blades retracted without any need to stop the operations of the feeder operating parts or of the timing and switching valves of the mechanism for timing the periodic shear cuts when resumption thereof is desired. The auxiliary air valve 211 will be closed. When the shears are to be restored to operation, the handle 209 will be turned to the "normal" position thereof.

It will be noted that with the construction shown, the shears would operate with the handle 209 in the "reversing" position but that the reciprocations of the air motor piston would be determined by the switching valves which would be supplied with air constantly from the auxiliary air valve 211 as well as periodically from the timing valve 101. This operation would lack the accurate control of time intervals between successive shear cuts but might be satisfactory for some glass feeding operations. Should the auxiliary air valve 211 not be required in a particular installation, then timing of the shear cuts would be the same with the handle 209 in either its "normal" or "reversing" position and movement from either position to the other would reverse the air motor.

Many changes in and modifications of the details of the illustrative embodiment of the invention will now be obvious or readily occur to those skilled in the art and I, therefore, do not wish to be limited to such details.

I claim:

1. In glass severing mechanism comprising a pair of shear blades, a pair of pivoted arms supporting said shear blades for swinging movements toward each other to close said blades and away from each other to open said blades, a fluid pressure motor comprising a cylinder and a piston reciprocable in said cylinder, and motion transmitting connections between said piston and said pivoted arms operable on reciprocation of said piston to close said shear blades at approximately the mid-stroke of the piston in either direction in the cylinder and to open said shear blades during continued movement of the piston in the same direction, the combination with said motor of means to reciprocate said piston in the cylinder comprising a normally closed fluid pressure timing valve having an inlet connection with a constant source of fluid pressure and having an outlet, a pair of normally closed fluid pressure switching valves having inlets operatively connected to the outlet of said timing valve and having outlets, respectively operatively connected to the opposite ends of the motor cylinder, means to actuate said switching valves to open and hold them open alternately for a predetermined period and then permit them to close, all in cyclic order so that each switching valve is open when the other is closed and vice versa, and means to actuate said timing valve to open it periodically with regular frequency at times respectively occurring during successive alternating open periods of the switching valves and to close it after each opening thereof prior to the closing of the then open switching valve.

2. The combination defined by claim 1 wherein said means to actuate the timing valve comprises a rotary cam shaft having a single cam lobe fixed thereon in position to open the timing valve once during each complete rotation of said cam shaft and wherein said means to actuate said switching valves comprises a second rotary cam shaft connected with said first cam shaft to be driven at half the speed of the latter, and a pair of oppositely disposed cam lobes fixed thereon so as to be 180° out of phase with each other and so related in phase to the cam lobe on the first cam shaft that each opening of the timing valve by the latter will occur during opening of the timing valve by the latter will occur during opening of one or the other of said switching valves.

3. The combination defined by claim 1 wherein each of said switching valves has an exhaust outlet open for exhaust of pressure fluid from the connected end of the motor cylinder when the switching valve is closed and closed to prevent such exhaust when the switching valve is open for passage of pressure fluid therethrough to the motor cylinder.

4. In glass severing mechanism comprising a pair of shear blades, a pair of pivoted arms supporting said shear blades for swinging movements toward each other to close said blades, and away from each other to open said blades, a fluid pressure motor comprising a cylinder and a piston reciprocable in said cylinder, and gearing and linkage between said piston and said pivoted arms operable on reciprocation of said piston to close said shear blades at approximately the mid-stroke of said piston and to open said shear blades during the continued movement of the piston in the same direction, the combination with said motor of a pair of combination pressure fluid supply and exhaust switching valves, respectively operatively connected to opposite ends of said cylinder, means to operate said switching valves to open them alternately to permit passage of pressure fluid therethrough to the connected ends of the cylinder and after a predetermined period of time, to close each against passage of pressure fluid therethrough to the cylinder and simultaneously to open it for exhaust therethrough of pressure fluid from the connected end of the cylinder, a timing valve operatively connecting a source of fluid pressure with both said switching valves, means to operate said timing valve to open and close it in cyclic order and means to co-ordinate the operations of the means to operate the timing valve and the means to operate the switching valves so that the instants of successive openings of the timing valve will occur at regular intervals and each at a time when one of the switching valves has been opened to permit passage of pressure fluid therethrough to one end of the cylinder and the other switching valve has been opened for exhaust of pressure fluid from the opposite end of the cylinder and the closing of the timing valve after each opening thereof will occur before closing of the switching valve that is then open for passage of pressure fluid therethrough to an end of the cylinder.

5. The combination defined by claim 4 wherein the operative connection between said switching valves and the opposite ends of said cylinder includes a manually operable reversing valve.

6. The combination defined by claim 4 wherein the operative connection between said switching valves and the opposite ends of said cylinder includes a four-way reversing valve manually operable to reverse the pressure fluid and exhaust connections between the individual switching valves and the respective opposite ends of said cylinder and further operable manually to shut off all flow of fluid therethrough.

7. The combination defined by claim 4 wherein the operative connection between said switching valves and the opposite ends of said cylinder includes a manually operable reversing valve, and, in addition, a normally closed auxiliary air pressure supply valve having an operative connection with both said switching valves, and means providing an operative connection between said reversing valve and said auxiliary air supply valve to open the latter when the reversing valve is operated.

8. The combination defined by claim 7 wherein said operative connection between the reversing valve and the auxiliary air supply valve comprises a cam connected with the reversing valve to be given a bodily movement when the reversing valve is operated and movable means connected with the auxiliary air supply valve and located in the path of said movement of said cam so as to be actuated by the latter to open the auxiliary air supply valve.

9. The combination defined by claim 4 wherein the operative connection between said switching valves and the opposite ends of said cylinder includes a four-way reversing valve having an operating handle turnable from a normal operating position to a reversing position, a normally closed auxiliary supply valve adjacent to the four-way valve and connected to the switching valves to supply air under pressure thereto, and a cam movable with said handle so as to open the auxiliary air supply valve when the handle is moved to its said reversing position.

References Cited in the file of this patent

UNITED STATES PATENTS

| Number | Name | Date |
|---|---|---|
| 1,991,705 | Schreiber et al. | Feb. 19, 1935 |